Patented Aug. 31, 1948

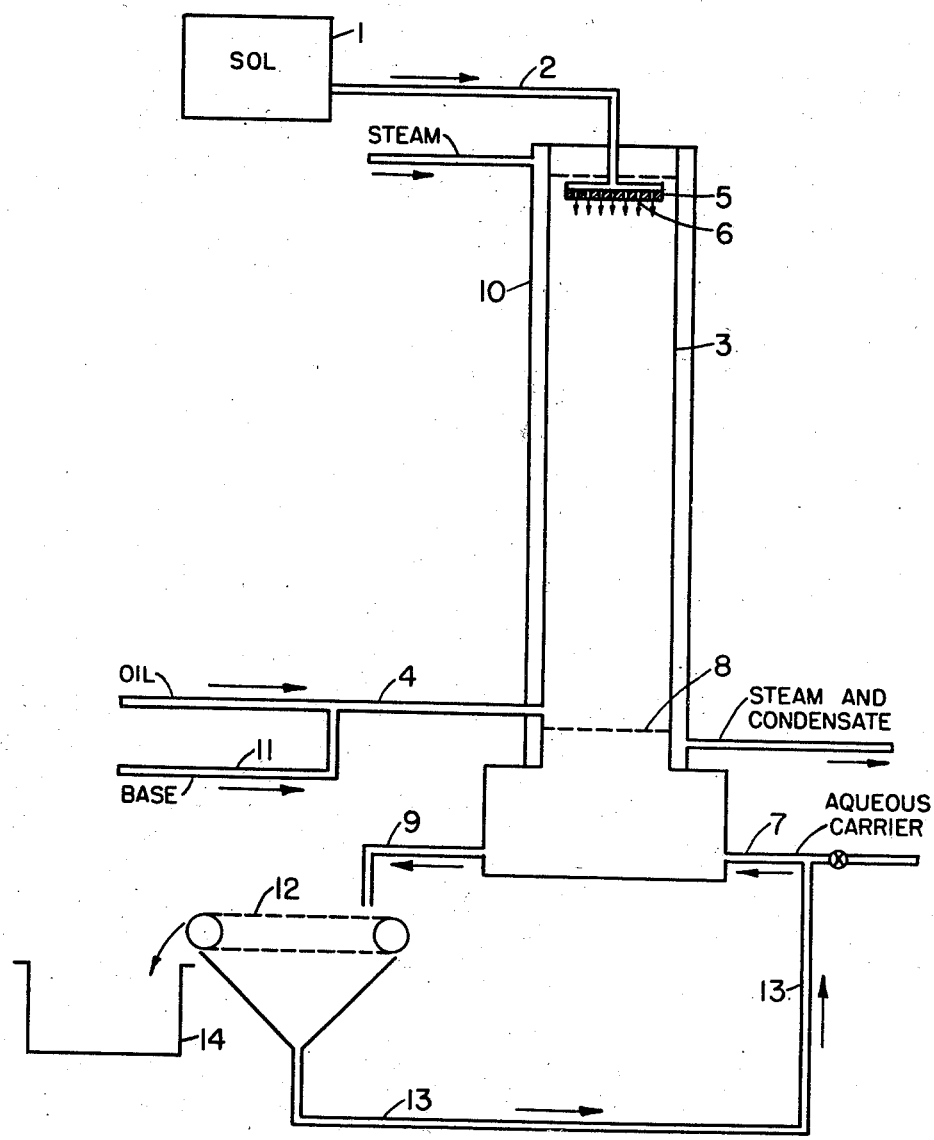

2,448,439

UNITED STATES PATENT OFFICE 2,448,439

PROCESS OF PREPARING AN INORGANIC HYDROGEL

Charles N. Kimberlin, Jr., and Jerry A. Pierce, Baton Rouge, La., assignors to Standard Oil Development Company, a corporation of Delaware Application March 11, 1944, Serial No. 526,050

1 Claim. (Cl. 252—317)

The present invention relates to the art of producing adsorbent gels in spherical form and especially in sizes from about 0.25 mm. up to about 5 mm. in diameter. These materials are cheaply prepared by the present method and are very useful for the adsorption of vapors and for catalytic purposes.

Inorganic gels are well known and have been long used for various purposes, for example, for the adsorption of condensible vapors from gaseous carriers and for catalytic purposes either as the catalyst itself or as a component thereof or as a carrier. Silica gel is the best known and the most widely used, but other gels such as those of alumina are also useful. Simple gels may be used alone or after impregnation with catalytic materials or, if desired, plural gels such as silica-alumina gels may also be used. The present invention deals with the preparation of such gels which can be used for any of the above mentioned purposes either as simple gels or various mixtures. The present methods are capable of producing gel particles in remarkably uniform spherical shapes which are particularly desirable for industrial uses and have many advantages over the irregularly shaped particles ordinarily produced by grinding the larger gel aggregates.

It has already been proposed to prepare large sized hydrogel spheres by causing a sol to set while descending in the form of drops through a column of a water-immiscible liquid such as an oil and removing the spheres from the column by a stream of water on which the oil floats. The use of water for removing the hydrogel spheres from the column is undesirable when employing sols of fairly high density since a great difference in density between sol and the oil causes the sol to descend the column quite rapidly so that a very long column is required to give the desired contact time. Furthermore a too rapid descent results in somewhat flattened spheres.

It is therefore an object of this invention to provide an improved method for preparing large hydrogel spheres.

These and other objects of this invention are attained by properly controlling the density of dispersing medium in which the sol is set, the density of the aqueous carrier, and the density of the sol so that the difference between the three densities is just sufficient for the dispersing medium to float on the carrier and the sol to slowly descend through each. For example when using a sol having a density of 1.20, the density of the oil could be adjusted to 1.15–1.18, while that of the aqueous solution could be adjusted to 1.19.

The density of the aqueous carrier is adjusted by dissolving in water the proper amount of a salt such as sodium chloride or sodium sulfate, or an acid such as sulfuric or phosphoric acids, or even an organic material such as sugar. However, since many hydrogels contain salts as contaminants, it is preferable to remove the hydrogel from the column with a solution of the salt which is present in the hydrogel so as not to introduce an additional contaminant into the hydrogel. For example when using a sol prepared from sodium silicate and sulfuric acid, an aqueous carrier consisting of a solution of sodium sulfate or of sulfuric acid of the proper density is suitable.

A water-immiscible liquid may be chosen which has the proper density, but it is preferable to use a liquid such as an oil and then adjust its density by the addition of the proper amount of a heavy substance, such as acetylene tetrabromide or dibromo-ethane.

Referring to the drawing, numeral 1 is a storage tank in which a sol of the desired gel is prepared. The methods for the preparation of these sols need not be described in detail here because the methods themselves are well known in the art and certain illustrative details will be furnished in the examples attached hereto. Suffice it to say that all of the well known techniques may be employed, and concentration, proportion of ingredients, pH of the sols and other factors are adjusted so as to prepare hydrogels which will set firmly and rather rapidly, say in one-quarter to one-half hour, more or less. The sol is taken from tank 1 and is fed through a pipe 2 into the top of tower 3 which is filled with a water-immiscible liquid introduced through line 4 and having a density only slightly below that of the sol. The sol is discharged, preferably just below the surface of the liquid through a distributor head 5, which is fitted with a plurality of orifices 6 which may vary in diameter from $\tfrac{1}{16}$ to $\tfrac{1}{4}$ in. but preferably are about $\tfrac{1}{8}$ in.

Suitable liquids that can be used for this purpose are kerosene, heavy naphtha, light gas oil, lubricating oils, coal tar oils such as xylol, the density of which is controlled by adding proper amounts of bromo-ethane, acetylene tetrabromide, etc. The flow through the orifice may be controlled through wide limits. If uniformly sized spherical particles are desired it will be necessary to control the flow through the orifice so that the sol emerges in droplets which grow to a pre-formed size and then break away from the tip. However, this is usually not desirable since it is generally too slow and uniformly sized spheres are not necessary as a rule. The size of the orifice and rate of feed may therefore be controlled so that the sol flows in a steady stream into the water-immiscible liquid where, due to its higher density, it settles slowly through the column of oil and at the same time breaks up into spherical particles.

An aqueous solution of a salt or an acid is forced into the lower part of the tower 3 by pipe 7 so that a layer thereof is accumulated in the lower portion of the tower with an oil-water interface maintained as indicated at the level 8. This solution has a density slightly above that of the water-immiscible liquid but below that of the sol, so that the former floats on the aqueous solution. The sol globules are given time in passing down through the column 3 to harden into hydrogels and they have no difficulty in passing through the interface at 8 and into the aqueous phase since hydrogels are found to be considerably more easily wet by water than by the oil. A slurry of water containing spherical particles of hydrogel is then removed from the lower part of the tower in a flowing stream which emerges through pipe 9. Returning to the tower 3, provision is made for maintaining it at a desired temperature most suitable for gelation of the particular sol employed by means of steam jacket 10. In the case of certain gels, it is desirable to shift the pH from the value in the sol so as to induce gelling, and basic materials such as morpholine may be added to the oil, as by the pipe 11, just prior to its introduction into the column 3. This basic material will then be transferred to the sol during the descent of the sol through the oil.

The hydrogel particles removed through line 9 are passed to a filter 12 where the aqueous solution is separated and recycled through line 13. Hydrogel particles are discharged from filter 12 into storage hopper 14 from which they may be passed to finishing operations such as washing, impregnating with catalytic materials, drying, etc.

It is most convenient to prepare hydrogels which will set at ordinary temperatures in 15 to 45 minutes but which will set within one to two minutes at the temperature of the column. If the sol is of such a type that it requires a longer time at ordinary temperatures, say 2 hours, to act, it is desirable to wait until all but a few minutes of the setting time have elapsed and then introduce it into the column of oil so that the setting time in the column is only that of the actual setting time remaining. The height of the column is adjusted so that the hardening will take place in the time necessary for the particles to pass through the column. The time of passage is a function of the viscosity of the oil, the difference in the densities between the oily liquid and the particles, and the size of the drops.

Viscosity can be adjusted to some extent by selection of the oil employed and a considerable variety or range is presented by the use of hydrocarbon oils which range from naphthas of very low viscosity to light and heavy lubricating oils of considerably greater viscosity. Polymers such as poly-isobutenes may also be added to the oil to increase the viscosity. The adjustment of temperature increases the rate of gelation and at the same time varies the viscosity of the medium in which the gel particles are suspended. In general the oil in the column is maintained in a relatively quiescent state so as to maintain the gel particles in the desired size, but there may be a slow flow upwardly through the column, and this gives an additional means for controlling the time in which the droplets are exposed to gelling conditions. There should be no turbulence, but nevertheless flow can be maintained so as to control the time within the gelling zone as long as desired. All of these factors are readily adjusted or inter-adjusted in order to obtain a firm hydrogel at the discharge end of column 3.

The products prepared by the present methods are globules of nearly perfect spherical form and remarkable uniformity in size. The diameter of the particles can be controlled by the various factors mentioned above quite easily between the ranges of about 0.5 to 10 mm. in the hydrogel state which dry to gel particles having diameters between 0.25 and 5 mm. Such materials have many industrial uses.

The following experiments are given to indicate in general the preparation of the gels according to this invention and while they are illustrative they are not given with the intent of limiting the scope of the invention to the specific instances presented.

*Example 1*

A 25° Bé. solution of sodium silicate was prepared by diluting 40° Bé. commercial material with water. A solution of sulfuric acid was prepared by adding 1.84 specific gravity sulfuric acid to water so that the solution represented approximately a 29% by volume mixture. The two solutions were cooled to room temperature and the density checked by means of hydrometers. The density of a properly mixed sol was also determined and found to be 1.21.

Dibromo-ethane was added to a lubricating oil until an intimate mixture was found to have a density slightly less than that of the sol, i. e. 1.18.

A sol was prepared by pouring into 90 cc. of the acid solution 100 cc. of the silicate solution. The sol was then sprinkled into the oil through perforations. It was found that setting started within five minutes, that soft hydrogel spheres formed in ten minutes and that they were firm enough to be removed at the end of half an hour.

The spheres were removed to an aqueous solution of sulfuric acid having a density of 1.19 and were washed by continuous decantation over night. The wash water was then found to contain no traces of sulfate ion by chemical test. The spheres were covered with a film of lubricating oil and allowed to dry slowly at a moderate temperature (90–100° F.). They were then removed to a muffle furnace where the temperature was slowly raised to 900° F. At the end of three hours the spheres were freed of their oily coating and were hard and porous.

The nature and objects of the present invention having thus been set forth and specific example illustrative of the same given, what is claimed as new and useful and desired to be secured by Letters Patent is:

Process for preparing silica hydrogel in spherical form which comprises mixing sodium silicate and sulfuric acid to form a sol having a density of 1.21, suspending spherical droplets of said sol in a mineral oil containing sufficient acetylene tetrabromide to raise the density of the oil to 1.18, passing said suspended sol downwardly through said oil until said sol sets to silica hydrogel spheres, and removing said hydrogel spheres from said oil by dropping into an aqueous solution of sulfuric acid having a density of 1.19.

CHARLES N. KIMBERLIN, JR.
        JERRY A. PIERCE.

REFERENCES CITED

The following references are of record in the file of this patent:

UNITED STATES PATENTS

| Number | Name | Date |
|---|---|---|
| 1,195,099 | Salm | Aug. 15, 1916 |
| 1,614,636 | Wachtel | Jan. 18, 1927 |
| 2,102,849 | Kokatnur | Dec. 21, 1937 |
| 2,284,248 | Baker et al. | May 26, 1942 |
| 2,385,217 | Marisic | Sept. 18, 1945 |

FOREIGN PATENTS

| Number | Country | Date |
|---|---|---|
| 100,392 | Great Britain | June 15, 1916 |

OTHER REFERENCES

Inorganic and Theoretical Chemistry, Mellor, vol. VI (1925), page 291.